UNITED STATES PATENT OFFICE.

HARRY D. BAYLOR, OF SELLERSBURG, INDIANA, ASSIGNOR TO LOUISVILLE CEMENT COMPANY, OF LOUISVILLE, KENTUCKY, A CORPORATION OF KENTUCKY.

PROCESS OF MAKING CEMENT.

1,323,952.  Specification of Letters Patent.  Patented Dec. 2, 1919.

No Drawing.  Application filed March 17, 1919.  Serial No. 283,013.

*To all whom it may concern:*

Be it known that I, HARRY D. BAYLOR, a citizen of the United States, residing at Sellersburg, in the county of Clark and State of Indiana, have invented a certain new and useful Improvement in Processes of Making Cement, of which the following is a specification.

My invention relates to the production of hydraulic cement, especially, but not necessarily, "natural" cement, and the object is to produce a cement which will set slowly, thus affording plenty of time for handling and finishing.

It is now recognized by authorities that the initial set in hydraulic cement is due to the break-up of the calcium aluminates in the cement upon the admixture of water. During this break-up lime is liberated which undergoes hydration to calcium hydrate, and it is this phenomenon that is recognized as causing the quick initial set of cement and is held responsible for its early strength. The final strength of the hardened cement is recognized as being due to the hydration of the calcium silicates present. It is generally accepted that the calcium aluminate strength reaches its maximum quickly and by the end of 30 days is quite largely lost. Consequently, the enduring strength of cement work is due to the calcium silicate compounds in the original cement. In natural cements, especially those containing a considerable proportion of free lime and aluminates, this early set takes place very fast; in fact it often quite seriously handicaps the work, and with careless workmen much inferior cement work results; for often the workmen try to break the early set, thinking not to interfere with the final set, and frequently such procedure on the job results in the cement being worked when the final set is taking place, and consequently the cement work never gets as strong as it should.

The object of my invention is to produce a cement which will avoid this quick initial set, and will give time enough for the production of careful workmanship and superior finish in the cement work.

To give a typical example of the method of practising my process, I take 1650 lbs. of natural hydraulic cement, 200 lbs. of quick lime (CaO) and grind them together in a suitable mill to about a fineness such that about 85% of it will pass through a 100 mesh screen. I then place the mixture in any suitable commercial type of lime hydrator and add the amount of water necessary for the complete hydration both of the lime which is added and that which results from the break-up of the calcium aluminates. While the amount of water will of course vary with the proportions and characteristics of the constituent elements, the amount of water required will usually run in the neighborhood of about 150 lbs. Thus in an ordinary case in each ton the natural cement will constitute about 82½% of the total; the quick lime about 10% of the total, and the water about 7½%. But, as stated, these proportions will vary with cements of varying composition.

When the reaction has taken place, the mass is discharged from the hydrator in dry form after which it is ground in any suitable type of mill. The product is then ready for bagging and shipment.

As a result of this process, I change a quick setting hydraulic cement,—that is, one in which the initial set occurs in from 5 to 10 minutes, to a slow setting one, with an initial set running from 4 to 8 hours, and with the final set in excess of 9 hours. This cement can be retempered or reworked at any time up to 9 hours without losing any of its final strength, and with my product the strength is equal to the strength of the original cement before treatment.

While I do not wish to be understood as making definite representation in this regard, it is my understanding that the underlying principle of the above process is that the quick setting calcium aluminates are permitted to break up chemically and recombine without permitting them to solidify the mass. The prevention of solidification is caused not only by the mechanical action of the hydrator, but also by the physical action of the lime during its hydration; for it is well known that the hydration of lime is accompanied not only by the generation of heat, but by the physical expansion of the constituent molecules as the elements combine. In my process the excess calcium oxid added to the mass commences to undergo its hydration with the extra water before the calcium silicates are affected; and the affinity of this free lime for water is so strong that when the action is once started, the lime either chemically absorbs or, by the heat generated, vaporizes all the free water in the mass. Hence, when more water is added, as will be done when the resulting cement is to be used, only the slow setting silicates retain their ability to set and the quick setting substances in the original mass have had their setting properties destroyed.

Attention is directed to my co-pending application filed on even date herewith, Serial Number 283,014, allowed May 21, 1919.

Having thus described my invention what I claim as new and desire to secure by Letters Patent, is:—

1. The process of slowing the setting properties of aluminate containing cement consisting in comminuting the untreated cement, mixing calcium oxid with it in a proportion between 6 to 1 and 10 to 1 by weight, and stirring into the mixture the amount of water approximately necessary for the complete hydration of all the free calcium oxid in the mass, including that added as quick lime and that resulting from the break-up of the aluminates.

2. The process of converting quick setting cement containing an aluminate to a slow setting cement consisting in comminuting the cement, mixing calcium oxid with it, and stirring in the presence of enough water to hydrate the free calcium oxid, including the amount added and the amount which results from the break-up of the aluminates.

3. The process of converting quick setting cement containing an aluminate, to a slow setting cement, consisting in mixing the cement with lime in the proportion of approximately eight parts of cement to one of calcium oxid, comminuting the mixture and stirring in the presence of enough water to hydrate the free calcium oxid, including the amount added and the amount which results from the break-up of the aluminates.

4. The process of converting quick setting cement containing an aluminate to a slow setting cement consisting in mixing the cement with quick lime and water approximately in the following proportions by weight: untreated cement $81\frac{1}{2}\%$, quick lime $10\%$, water $7\frac{1}{2}\%$, and comminuting the resulting mass.

5. As a composition of matter, slow setting cement having its calcium aluminates hydrated and containing additional hydrated calcium oxid over that resulting from the break up of the aluminates and from the hydration of the free lime in the original cement.

6. The composition of matter resulting from grinding natural cement and quick lime, adding sufficient water to hydrate the added lime and the lime resulting from the hydration of the aluminates of the cement, and comminuting the resulting mass.

7. As an article of manufacture, cement resulting from mixing an aluminate-containing cement with quick lime, comminuting the mixture, mixing with enough water to hydrate the lime which is added and that which is formed by the break-up of the aluminates, and comminuting the resulting mass.

8. Slow setting cement produced by taking natural cement and quick lime in the proportions of about 8 to 1, grinding them together, adding about 1 part of water to every 12 parts by weight of the mixture, and comminuting the resulting mass.

9. As a composition of matter, cement containing silicates and aluminates, the aluminates being in hydrated form and the silicates in anhydrous form.

10. As a composition of matter, cement containing lime in anhydrous form, an aluminate substantially in hydrated form and a silicate chiefly in anhydrous form.

11. As a composition of matter, comminuted cement containing lime in both hydrated and anhydrous form, calcium aluminate chiefly in hydrated form, and calcium silicate chiefly in anhydrous form.

In witness whereof, I have hereunto subscribed my name.

HARRY D. BAYLOR.